United States Patent
Gutierrez et al.

(10) Patent No.: US 6,614,779 B1
(45) Date of Patent: Sep. 2, 2003

(54) CDMA PHYSICAL LAYER PACKET MECHANISMS FOR DISTRIBUTED BURSTY TRAFFIC

(75) Inventors: Alberto Gutierrez, Plano, TX (US); Serge Manning, Plano, TX (US); Ahmad Jalali, San Diego, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/238,443

(22) Filed: Jan. 28, 1999

Related U.S. Application Data

(60) Provisional application No. 60/074,976, filed on Feb. 17, 1998.

(51) Int. Cl.[7] .................................................. H04J 3/06
(52) U.S. Cl. ................................. 370/350; 370/508
(58) Field of Search ........................ 370/320, 322, 370/329, 330, 335, 341, 342, 442, 348–350, 433, 437, 441, 458, 461, 462, 468, 470, 471, 508, 509, 512

(56) References Cited

U.S. PATENT DOCUMENTS

| | | | |
|---|---|---|---|
| 5,022,046 A | 6/1991 | Morrow, Jr. ........................ 375/1 |
| 5,103,459 A | 4/1992 | Gilhousen et al. ............. 375/1 |
| 5,384,777 A | 1/1995 | Ahmadi et al. ............. 370/85.2 |
| 5,559,804 A | 9/1996 | Amada et al. ............. 370/95.3 |
| 5,689,502 A | * 11/1997 | Scott ........................... 370/509 |
| 6,347,082 B1 | * 2/2002 | Kranz et al. ................. 370/442 |

FOREIGN PATENT DOCUMENTS

| EP | 0901242 A2 | * 9/1997 | ............ H04B/7/26 |

* cited by examiner

*Primary Examiner*—Steven Nguyen
*Assistant Examiner*—Phuongchau Ba Nguyen
(74) *Attorney, Agent, or Firm*—Carr LLP

(57) ABSTRACT

A new access channel protocol for use in cellular systems such as CDMA whereby the data transfer efficiency of an access message is increased by removing the requirement that a preamble frame and a message capsule frame have equal times of duration. With such removal, the BTS must inform listening MSs as to the time duration of the frames in each of the preamble and the message portions of the access channel time slot in addition to previously supplied information as to the number of frames in each portion. When unequal frame duration times are allowed, each portion of the access channel may be more nearly optimized to the actual time required to perform the functions of synchronization and message detection.

12 Claims, 2 Drawing Sheets

CDMA PHYSICAL LAYER PACKET MECHANISMS FOR DISTRIBUTED BURSTY TRAFFIC

This application claims the benefit of Provisional application Ser. No. 60/074,976 filed Feb. 17, 1998.

TECHNICAL FIELD

The present invention relates in general to wireless communication systems and in particular to a code division multiple access (CDMA) protocol named Slotted Aloha for transmitting packets of data between a mobile subscriber or station (MS) and a base station (BS) over an access channel slot comprising a preamble portion and a message capsule portion.

BACKGROUND

In prior art CDMA wireless systems, a mobile station (MS) would access a base station (BS) using a protocol named slotted Aloha.

When a MS is turned ON, it synchronizes itself to receive forward link (FL) transmissions from the BS as part of an initialization process. This synchronization is maintained as the MS moves about the cell generated by transmissions from the BS. Because this synchronization is maintained, the BS may send data to any specific MS or to all MSs in the vicinity of the BS in accordance with standardized protocols. This synchronization process is not applicable to transmissions over the reverse link (RL) from a MS to a BS.

An MS may contact or access a BS to register when entering a system foreign to its registered home system or to originate a service like a voice call and so forth. Thus CDMA wireless systems provide for allowing an MS to access the BS over an access channel during any one of consecutive time periods defined as access channel slots in accordance with the previously referred slotted Aloha protocol. If an MS is not making an outgoing call, it may remain in an ON condition all day and never use the access channel.

To perform the access function, the mobile sends an access probe comprising one time slot including a preamble time portion and a message capsule time portion. During a portion of the preamble time, the base station searches for a mobile station transmission. This portion is called the search window. If a mobile station transmission is detected by the BS, then the BS will try and synchronize to the mobile station's transmission during the preamble time.

After the preamble portion of the time slot is completed, the base station will decode the message capsule.

The slotted Aloha protocol is known as a random access protocol which may experience collisions due to more than one mobile station attempting to access the base station during the same time slot. This condition may be alleviated by designing the hardware to accommodate more than one mobile station per slot. Such action or designing is outside the scope of this invention.

In the slotted Aloha protocol, implemented in current CDMA mobile phone systems, of the prior art, the preamble consists of a multiple of 20 millisecond frames. The message capsule also consists of a plurality of 20 millisecond frames. The number of 20 millisecond frames in each of the preamble and the message capsule portions of the time slot may be adjusted on a base station by base station basis throughout the wireless system in accordance with the radio environment for each base station. In other words, certain poor quality radio environments or environments where the base station covers a large area may require a longer preamble than base stations having a smaller area or better radio environment. Further, it may be that mobile station subscribers located in the area of some base stations typically transmit longer messages than occurs at other base stations. In such a situation, it may be more expedient to have more frames in the message capsule portion of the access channel slot for those base stations than for other base stations typically having shorter messages. The efficiency of this protocol is bounded by equation 1 where M is the number of message capsule frames and P is the number of preamble frames.

$$M*0.02/(P*0.02+M*0.02) \qquad (1)$$

In other words, if, as an example, there were 5 message frames and it took more than 2 preamble frames but less than 3 preamble frames to assure synchronization at any site within the cell defined by a given BS, the maximum efficiency would be (5*0.02)/(3*0.02+5*0.02) or 62.5%.

If the worst case time to assure synchronization with respect to a given BS for the example outlined above happens to be 2.1 frames, then 9/10ths of the preamble time frame is "wasted" each access period.

Thus far, this discussion has identified inefficiencies due to the preamble frame duration. In addition to the preamble frame duration, the frame time duration of the message capsule will also impact the overall protocol efficiency. However, there are additional constraints. For example, the message capsule frames also contain overhead bits, where usually the number of overhead bits remains constant independent of the frame duration. Thus, a decrease in the frame time for the message capsule, without proper adjustments (e.g., like increasing the message capsule data rate), could cause the overall protocol efficiency to decrease.

It would thus be desirable to provide a method whereby the time required to obtain preamble synchronization (i.e., a multiple of the preamble frame duration) is not required to be identical to the message capsule frame duration and in the most general case not required to be a frame time related multiple or sub-multiple of the message capsule frame time.

SUMMARY OF THE INVENTION

The present invention comprises the method of increasing the efficiency of data transmission, between a mobile subscriber or station (MS) and a base station (BS), by altering the frame size (time slot length) of at least one of the access channel preamble and the access channel message capsule from that standardized in the prior art.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

Figure 1:
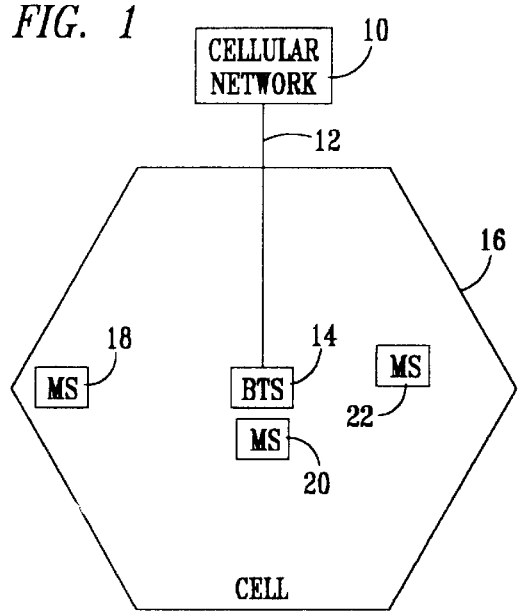
FIG. 1 is a block diagram of a cellular system for use in explaining the operation of the invention.

In FIG. 1 a cellular network is represented by a block 10 and is connected via a communication connection 12 to a base transmission station (BTS) 14. An area 16 around the BTS 14 defines a cell within which are located several mobile stations. One station 18 is located near the edge of cell 16 while a second mobile station 20 is located adjacent BTS 14. A third mobile station 22 is located intermediate the distance from BTS 14 to the edge of cell 16.

Figure 2:
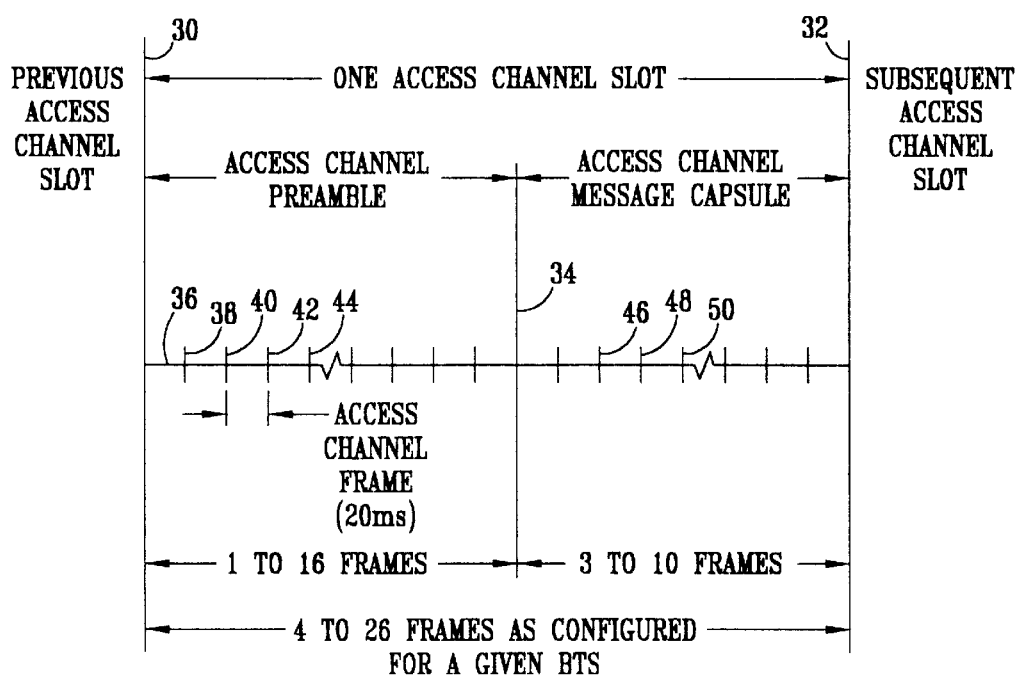
FIG. 2 is a representation of an access channel time slot as practiced in the prior art slotted Aloha protocol.

In FIG. 2 a vertical line 30 defines a demarcation between a previous access channel slot and an access channel slot shown in detail. A second vertical line 32 delineates between the detailed access channel slot and a subsequent access channel slot. As indicated, the time between lines 30 and 32 represents the time completed during one access channel slot. Between lines 30 and 32, a third line designated as 34 divides the access channel slot into an access channel preamble (left-hand side) and an access channel message capsule (right-hand side). A horizontal line 36, extending from lines 30 to 32 is intersected by a plurality of indicia. On the left-hand side several indicia, 38, 40, 42 and 44 are numerically designated. Between lines 34 and 32, several additional indicia 46, 48, and 50 are also designated. After each of the indicia 44 and 50, a symbol is used to show a break in the number of indicia. As indicated in the preamble portion, each of the indicia represent one frame of information and the prior art standards set forth by IS-95 stated that each of the frames would last 20 milliseconds. The preamble may be set at any number of frames from one to 16 in accordance with the radio conditions determined to be in a given cell. The prior art provided for a range of three to 10 message frames in accordance with traffic conditions in a cell. Thus the standard provided for a flexibility of each access time between channel slots (vertical lines 30 and 32) ranging from four to 26 frames for a given BTS.

Figure 3:
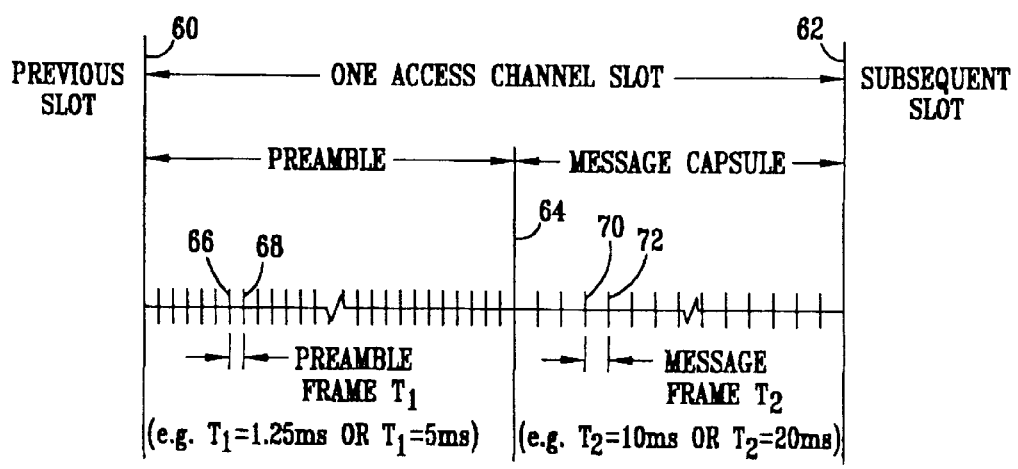
FIG. 3 is a representation of an access channel time slot as practiced in the present invention

In FIG. 3 a first vertical line 60 provides a demarcation between a previous access channel slot and an access channel slot shown in detail. A further vertical line 62 provides an indication of the end of the access channel slot shown in detail and a subsequent access channel slot. A vertical line 64 shows the demarcation between the preamble portion of the channel slot and the message capsule portion of the channel slot. A plurality of equally spaced indicia are shown on the preamble side with two of the indicia labeled as 66 and 68. On the message side a further plurality of indicia are illustrated. These indicia are equally spaced but are spaced differently than those on the preamble side. Two of the indicia are in the message side are indicated as 70 and 72. As an example, the indicia 66 and 68 may represent a preamble frame of the 1.25 milliseconds or alternatively could represent a frame having a time duration of five milliseconds. A message frame such as indicated by an indicia 70 and 72 would typically last a longer time than would preamble frames. Thus, for example, the time represented by message frame indicia 70 and 72 might be either 10 milliseconds or 20 milliseconds. In further explanations the preamble frame time will be represented by T1 and the message frame time will be represented by T2.

While not shown in either of FIGS. 2 and 3, for the purpose of lessening the probability of collisions, it should be noted that the IS-95 standard for the telecommunications industry allows for a randomization delay between the left-hand side of an access channel slot and the actual access probe transmission from the mobile station.

As is known in the industry, as an MS moves around a cell, the radio environment may change so that at different locations, more or less time is required for a BTS to synchronize with the preamble signal than it did at another location in the cell. In setting up a cellular system, many conditions are checked to determine the maximum time required for a BTS in a given cell to synchronize to a preamble signal in an access channel slot. As discussed in the background section, if it requires slightly more than two 20 ms frames (more than 40 ms) for the BTS to achieve synchronization under worst case conditions, 60 ms would be used under the prior art protocol set forth in conjunction with FIG. 2. If a frame extending over a shorter time period such as 1.25 ms were used as set forth in FIG. 3, the synchronization time required for the preamble could more nearly be optimized. Furthermore, as will be discussed later, since a given number of bits of overhead data are required in each message capsule frame, smaller message capsule frames, without a corresponding change (increase) in data rate, would typically reduce message transfer efficiency.

Reference will now be made to FIG. 3, wherein it will be assumed that the preamble frames are chosen to be 1.25 ms in length and the time T2 for the message frames are chosen to be 20 ms. If the worst case condition for synchronization is 21 ms, 17 preamble frames will suffice for the preamble portion of the access channel slot. If equation 1 is used and 1.25 ms substituted for the preamble frame time, equation 2 below will be obtained and it will be determined that the protocol efficiency is now (5*0.02)/(17*0.00125+5*0.02) or 0.1/(0.02125+0.1), in general given by $$M*0.02/(P*0.00125+M*0.02). \quad (2)$$

This computation equals 82.47% potential efficiency as compared to the previously obtained value of 62.5% when the preamble frame was required to be the same time duration as the message capsule frame.

$$M*T2/(P*T1+M*T2) \quad (3)$$

The efficiency bounds of the present inventive protocol may thus be expressed in the general terms of equation 3 where M and P are as previously defined and T1 is representative of the time duration of a preamble frame while T2 is representative of the time duration of a message capsule frame.

Since the preamble time is shortened while still allowing the same number of message data bits to be transmitted, the access channel slot time duration is decreased. Thus the total number of accesses by MSs over a period of time is increased for a greater data throughput.

As shown in FIG. 3, this invention allows the time duration of both the preamble frames and the message capsule frames to deviate from the standards set forth in the prior art IS-95 industry accepted standard.

All of the above calculations used a message capsule frame time duration of 20 ms along with 5 message capsule frames to keep data throughput identical. If message frames were to be decreased fractionally in time duration to more optimally meet data transfer requirements in a given cell, then the protocol efficiency, as described in equations (1) to (3), would be improved; however, the message capsule data efficiency may be decreased as will be discussed below.

The bounds for data efficiency is expressed in equation 4.

$$\text{(max information data bits per frame)/(Information Bits+Overhead Bits per frame)} \quad (4)$$

An analysis of equation 4 will illustrate that the data efficiency may be increased by increasing any of the items in the numerator while keeping the denominator constant and or by decreasing the denominator.

As an example, if T2=19 ms as opposed to the previously assumed 20 ms, the total amount of data transferred in 5 frames would be less. This result occurs because the same number of overhead bits will still be required for each frame thereby leaving less space for load or message data. If however the necessary amount of data can be optimally transferred in five 19 ms frames it may now be determined that the efficiency bounds are potentially as high as (5*0.019)/(17*0.00125+5*0.019) or 0.095/(0.02125+0.095) which equals 81.72%. However, the potential data efficiency for a given access slot is decreased under these assumptions, since the data efficiency is decreased according to equation 4 because the numerator decreases relative to the denominator.

The essence of equation 4 may be expressed in slightly modified format as equation 5.

$$T2*(\text{data rate})/(T2*(\text{data rate})+\text{Overhead Bits}) \quad (5)$$

This equation concentrates on the data rate of the message capsule frames to define the bounds of data throughput. In equation (5) the data rate is that of the information bits, wherein 'data rate' does not include overhead bits. Since the number of overhead bits per frame normally remains constant, it will be readily apparent that increasing the data rate will of necessity increase or at least maintain the potential data throughput, while decreasing the frame time.

It will be apparent that the present invention is directed to the method of and apparatus for increasing data throughput and access channel efficiency by at least removing the requirement that the frame duration in the preamble and message capsule portions of an access channel slot be identical. The invention further includes the method of and apparatus for altering frame duration times for access channel slots in different cells in a given cellular system.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. A cellular system comprising at least one base transmission station (BTS) for communicating with at least one wireless subscriber station (MS) comprising:

means within a BTS for synchronizing to received preamble signals, preparatory to receiving data, over an access channel wherein a given MS attempting access to the BTS transmits a given number P of preamble frames with each frame lasting a given time T1; and means within said BTS for receiving data from said given MS immediately after cessation of receipt of said preamble frames over a period of M message frames with each frame lasting a given time T2, wherein T1 is unequal to T2.

2. Apparatus as claimed in claim 1 comprising, in addition:

means for communicating with any MS that attempts to access a given BTS the values of P, M, T1 and T2.

3. A mobile station (MS) for use in a cellular system comprising a least one base transmission station (BTS) comprising:

means within the MS for transmitting a given number P of preamble frame signals with each frame lasting a given time T1, preparatory to transmitting data, over an access channel to a BTS whereby the BTS becomes synchronized with the MS; and means within the MS for transmitting a given number M of message frames with each frame lasting a given time T2, immediately after cessation of transmission of said preamble frames, wherein T1 is unequal to T2.

4. Apparatus as claimed in claim 3 comprising, in addition:

means for detecting transmissions from a nearby BTS that the MS wishes to access, and determining the values of P, M, T1 and T2.

5. A method of accessing a base transmission station (BTS) from a mobile station (MS) in a cellular system comprising the steps of:

transmitting a given number P of preamble frame signals with each frame lasting a given time T1, preparatory to transmitting data, over an access channel to a BTS; and transmitting a given number M of message frames with each frame lasting a given time T2, immediately after cessation of transmission of said preamble frames, wherein T1 is unequal to T2.

6. The method of claim 5 comprising, in addition:

detecting transmissions from a nearby BTS, that the MS wishes to access; and determining the values of P, M, T1 and T2.

7. A method of detecting an access attempt by a wireless subscriber station (MS) to a base transmission station (BTS) in a cellular system comprising the steps of:

synchronizing to received preamble signals from a given MS, preparatory to receiving data, over an access channel wherein the BTS detects a maximum given number P of preamble frames with each frame lasting a given time T1; and receiving data from said given MS immediately after cessation of receipt of said preamble frames over of period of M message frames with each frame lasting a given time T2, wherein T1 is unequal to T2.

8. The method of claim 7 comprising, in addition:

communicating with any MS that attempts to access a given BTS the values of P, M, T1 and T2.

9. A method of increasing the data rate of access channel supplied information from an MS to a BTS comprising, the steps of:

synchronizing to received preamble signals from a given MS, preparatory to receiving data, over an access channel wherein the BTS detects a maximum given number P of preamble frames with each frame lasting a given time T1; and receiving data from said given MS immediately after cessation of receipt of said preamble frames over of period of M message frames with each frame lasting a given time T2, wherein T1 is unequal to T2.

10. The method of claim 9 comprising, in addition:

communicating with any MS that attempts to access a given BTS the values of P, M, T1 and T2.

11. A method of increasing the data rate of access channel supplied information from an MS to a BTS comprising, the steps of:

using a first frame size T1 for detecting preamble synchronization frames;

using a second frame size T2 for transmitting information data immediately after cessation of said preamble synchronization frames; and wherein T1 is unequal to T2 for increasing the data rate of an access channel.

12. The method of claim 11 wherein:

the time T1 is time optimized to obtaining synchronization with all MSs within a cell defined by a BTS; and the time T2 is time optimized to data likely to be transmitted within said cell defined by said BTS.

* * * * *